United States Patent
Derbeko et al.

(10) Patent No.: US 9,733,969 B2
(45) Date of Patent: Aug. 15, 2017

(54) METHOD AND SYSTEM FOR MALWARE DETECTION IN VIRTUAL MACHINES

(71) Applicant: EMC Corporation, Hopkinton, MA (US)

(72) Inventors: Philip Derbeko, Modiin (IL); Assaf Natanzon, Tel Aviv (IL); Maya Bakshi, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 72 days.

(21) Appl. No.: 14/755,517

(22) Filed: Jun. 30, 2015

(65) Prior Publication Data
US 2017/0004302 A1    Jan. 5, 2017

(51) Int. Cl.
*G06F 21/00*    (2013.01)
*G06F 9/455*    (2006.01)
*G06F 21/53*    (2013.01)
*G06F 21/56*    (2013.01)

(52) U.S. Cl.
CPC .......... *G06F 9/45558* (2013.01); *G06F 21/53* (2013.01); *G06F 21/566* (2013.01); *G06F 2009/45579* (2013.01); *G06F 2009/45587* (2013.01)

(58) Field of Classification Search
CPC .............. G06F 21/56; G06F 9/45558; G06F 2009/45587; G06F 2221/034; G06F 2009/45579
See application file for complete search history.

(56) References Cited

U.S. PATENT DOCUMENTS

| | | | |
|---|---|---|---|
| 8,205,241 B2 * | 6/2012 | Lakshminarayanan | G06F 9/455 703/23 |
| 9,244,710 B2 * | 1/2016 | Bacher | G06F 9/45558 |
| 9,300,693 B1 * | 3/2016 | Manmohan | G06F 9/45558 |
| 2009/0307377 A1 * | 12/2009 | Anderson | G06F 9/5016 710/3 |
| 2009/0307435 A1 * | 12/2009 | Nevarez | G06F 12/10 711/147 |
| 2011/0179214 A1 * | 7/2011 | Goggin | G06F 3/061 711/6 |
| 2011/0179414 A1 * | 7/2011 | Goggin | G06F 3/061 718/1 |
| 2016/0335110 A1 * | 11/2016 | Paithane | G06F 9/45558 |

* cited by examiner

*Primary Examiner* — Mahfuzur Rahman
(74) *Attorney, Agent, or Firm* — Krishnendu Gupta

(57) ABSTRACT

Example embodiments relate to methods, systems, and a computer program product for detecting and responding to the presence of malware persistently executing in a monitored virtual machine of a virtual computing platform. The method includes logging I/O requests at a hypervisor kernel in a kernel log and at a virtual machine (VM) managed by the hypervisor in a VM log. The logged I/O requests then may be compared to detect evidence of malware according to differences between the I/O requests logged in the VM log and the kernel log.

19 Claims, 4 Drawing Sheets

METHOD AND SYSTEM FOR MALWARE DETECTION IN VIRTUAL MACHINES

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to malware detection.

BACKGROUND

Malicious software of "malware" includes so-called Advanced Persistent Threats (APTs) characterized by persistent, background execution with a purpose of stealing sensitive information and/or obtaining unauthorized access to computing resources. Detecting APTs and taking remediation actions has typically been difficult. Traditional anti-malware products, including anti-virus applications, depend on file signatures for detection of malware. Signatures of the executable files of known malware are stored in a database, and detection products scan a target system for files having matching signatures. Such detection techniques can be thwarted by creating variants that have the same or similar functionality but different signatures, a technique which is used to some degree by fraudsters. These detection techniques can also be thwarted by malware that actively seeks to avoid detection by disabling anti-virus software, embedding itself into an operating system kernel, and other methods.

There is a movement in computing toward virtual machine based computing platforms which employ emulated or "virtual" computers (machines) executing on a physical computer. Virtual machines are susceptible of infection with malware in the same manner as physical machines, and traditional anti-malware techniques have the same limitations arising from reliance on file signatures.

SUMMARY

Example embodiments relate to methods, systems, and a computer program product for detecting and responding to the presence of malware persistently executing in a monitored virtual machine of a virtual computing platform. The method includes logging I/O requests at a hypervisor kernel in a kernel log and at a virtual machine (VM) managed by the hypervisor in a VM log. The logged I/O requests then may be compared to detect evidence of malware according to differences between the I/O requests logged in the VM log and the kernel log.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Most known variants of advanced persistent threats (APTs) have a common behavior of persistency (i.e., making sure that malware code will run after infected machine is rebooted). Different persistent options usually include: changing specific files on the system or changing specific blocks on the disks, especially the master boot record (MBR). Detection might involve the use of detection software running on a potentially infected machine. However, running detection software within the same operating system as an APT may have may have certain limitations, such as the potential disabling of the detection software by the APT or the potential cloaking of the APT by a hiding technique. For example, if the MBR of a virtual machine (VM) disk is infected with malware, when the VM boots the malware runs, can hide in the VM kernel itself, and then is able intercept all I/Os going to storage. The malware then will be able to present a correct MBR to the kernel, which is stored in some other location, hiding the fact that the MBR on the disk is changed. It should be understood that any disk inspection will not detect this malware which is nearly invisible from any program that runs on the VM host.

These vulnerabilities present challenges to the deployment of malware detection software, particularly detection software that runs in the VM. These issues can be addressed in a virtual computing environment by making appropriate use of system components outside the operating system of a given (potentially infected) virtual machine. Accordingly, example embodiments of the present invention recognize that there's another layer before I/Os from the VM 120 reach storage 160—the hypervisor 110 which is insulated from the malware and from which the malware may not hide. A potential solution is to deploy detection software external to a potentially infected virtual machine (VM) in a virtual machine monitor or "hypervisor" which can be insulated from anti-detection activity of executing malware. Accordingly, a method and apparatus are disclosed for detecting and responding to the presence of malware persistently executing in a monitored virtual machine of a virtual computing platform.

Figure 1:
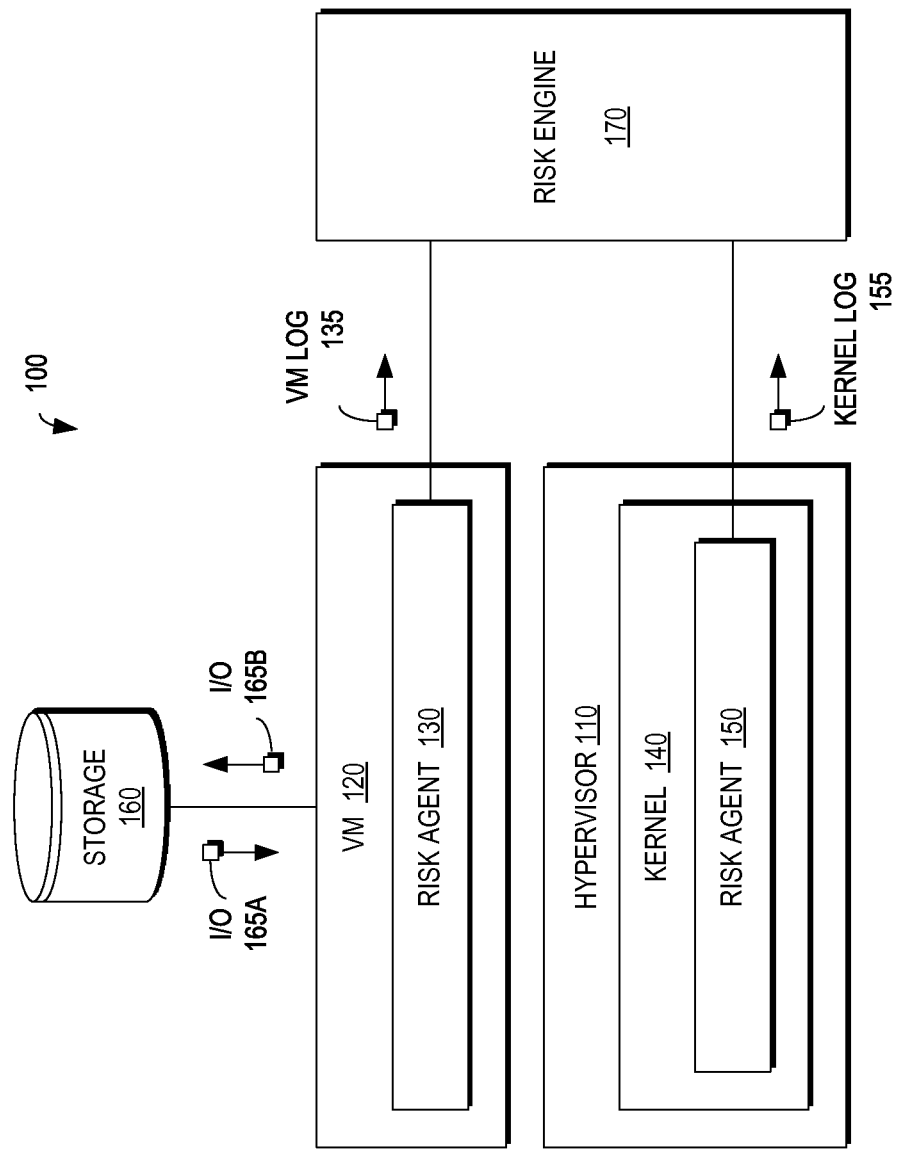
FIG. 1 is a block diagram illustrating a system according to an example embodiment of the present invention.

FIG. 1 is a block diagram of a system 100 according to an example embodiment of the present invention including a virtual machine (VM) computing platform managed by a hypervisor 110 coupled to a risk engine 170. The VM computing platform is a set of one or more physical computers providing data processing using the construct of a "virtual machine", which is software mimicking a physical computing machine. The VM computing platform includes a plurality of virtual machines (VMs) 120 (one illustrated for simplicity) which have interfaces to a hypervisor kernel 140 and the underlying physical computer or physical machine, which includes processor(s), memory, input/output circuitry etc. as generally known in the art.

The VM 120 engages in file system operation I/O requests 165A, 165B (165 generally) and network operations that require participation of the kernel 140 and thus in that sense are "visible" to the kernel 140. For example, an application seeking to create a file in the VM 120 invokes a function in the operating system of that VM 120 (not shown). The VM operating system in turn executes file system I/O operations 165 (e.g., allocating blocks of storage for the file) directed to a representation of a storage device that is presented to the VM operating system by the hypervisor 110. The hypervisor 110 translates these operations into corresponding operations on real physical storage devices in a manner transparent to the VM 120.

As described in more detail below, the risk engine 170 assists the VM may detect evidence of the presence of potentially harmful software, referred to as "malware", that may be executing in a VM 120. This detection is performed in part by detecting changes in I/O metadata during execution of an "infected" VM 120 (i.e., a VM 120 in which a given type of malware is executing). During operation, the VM computing platform gathers operational data provides it to the risk engine 170 to invoke an analysis of the operational data. For example, as illustrated in FIG. 1, each of the VM 120 and the hypervisor kernel 140 includes a respective risk agent 130, 150 through which all I/O operations 165 pass and are logged, as described in greater detail below. If evidence of malware is detected, then a control action can be taken to address the threat posed by the malware, which may include notifying a human system operator or taking some automatic action, for example. It should be understood that, other embodiments may include a physical host rather than a VM 120 and a risk engine 170 running in the storage 160. Further, the hypervisor risk agent 150 may be in the virtual Small Computer System Interface (VSCSI) layer. In other embodiments, the hypervisor risk agent 150 may be a filter driver running for the VM 120 which runs in the same user space as the VM 120 (i.e., intercepting I/Os generated by the VM 120 externally from the VM 120).

Although FIG. 1 shows a direct connection between the risk agents 130, 150 and the risk engine 170, it will be appreciated that communications between these components passes through the hypervisor 110 and physical computing hardware, similar to communications between any of the VM 120 and other external computers or devices. The organization of FIG. 1 is to highlight the special role of the risk agents 130, 150.

In certain embodiments, the risk agents 130, 150 may be EMC RecoverPoint splitters by EMC Corporation of Hopkinton, Mass. Each splitter may be an agent running on a production host, a switch, or a storage array which can intercept I/O and split them to a data protection appliance (such as EMC RecoverPoint by EMC Corporation of Hopkinton, Mass.) and to the storage array 160, fail I/O, redirect I/O, or do any other manipulation to the I/O. In certain embodiments, the risk engine 170 may be a data protection appliance (such as EMC RecoverPoint by EMC Corporation of Hopkinton, Mass.), which may be a computer or a cluster of computers (i.e., a physical device), or a set of processes (i.e., a virtual device or a combination of virtual and physical devices), that serve as a data protection appliance, responsible for data protection services including inter alia data replication of a storage system, and journaling I/O requests issued by a host computer to the storage system. A discussion of mirroring may be found in U.S. Pat. No. 7,346,805 entitled "PROTECTION OF MIRRORED DATA" issued on Mar. 18, 2008, a discussion of journaling and some techniques associated with journaling may be found in U.S. Pat. No. 7,516,287 entitled "METHODS AND APPARATUS FOR OPTIMAL JOURNALING FOR CONTINUOUS DATA REPLICATION" issued on Apr. 7, 2009, and a discussion of dynamically adding storage for a journal may be found in U.S. Pat. No. 7,840,536 entitled "METHODS AND APPARATUS FOR DYNAMIC JOURNAL EXPANSION" issued on Nov. 23, 2010, all of which are assigned to EMC Corporation of Hopkinton, Mass. and are hereby incorporated by reference in their entirety.

Figure 2:
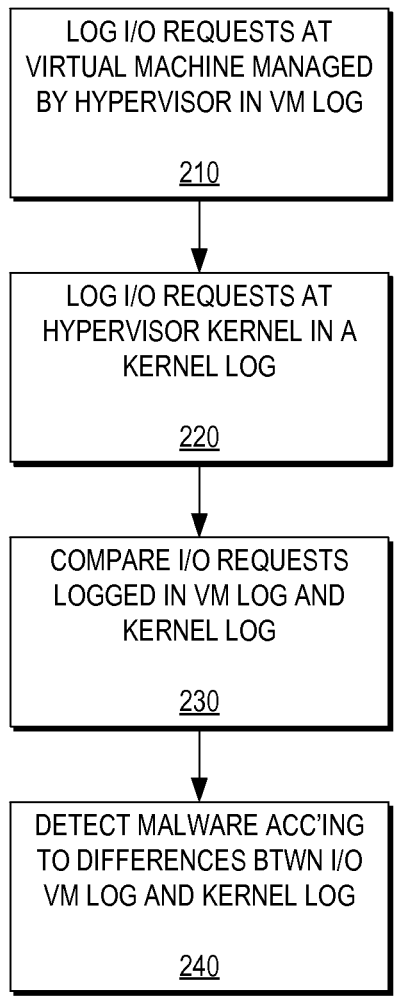
FIG. 2 is a flow diagram of a method according to an example embodiment of the present invention.

FIG. 2 is a flow diagram illustrating a method according to an example embodiment of the present invention. FIGS. 1 and 2 may be described in conjunction. As illustrated in FIGS. 1 and 2, the VM risk agent 130 may log I/O requests 165 in a VM log 135 (210). Likewise, the hypervisor kernel risk agent 150 may log I/O requests at the hypervisor kernel 140 managing the VM 120 in a kernel log 155 (220). In certain embodiments, the data logged by the risk agents 130, 150 may include I/O metadata relating to one or more of timestamp, I/O type (e.g., read, write), start address, offset, and length. Elements of the I/O metadata then may be compared by the risk engine 170 to look for evidence of malware operating on the VM 120. Further, for ease of comparison, certain embodiments may generate a signature (e.g., hash) of the VM log metadata and kernel log metadata for later comparison when investigating the presence of malware on the VM 120.

It should be understood that in certain embodiments, tracking storage I/O 165 request logs at the hypervisor kernel 140 level via the risk agent 150 allows advanced capabilities (e.g., VM boot-time recording) that are nearly impossible otherwise. In addition, tracking performed at this level is impossible to detect and bypass by malware operating at the VM level. Moreover, logging I/O requests 165 at the VM 120 in the VM log 135 may include logging I/O requests 165 to the master boot record for the storage 160 or to the VM operating system.

Each of the risk agents 130, 150 then may forward their respective logs 135, 155 to the risk engine 170. The risk engine 170 then may compare the I/O requests 165 logged in the VM log 155 and the kernel log 155 (230). Comparison of the VM logs 135, which are potentially tampered with, with hypervisor-level kernel logs 155 allows identification of discrepancies between those logs.

According to the results of the comparison, the risk engine 170 may detect evidence of malware operating in the VM 120 (240). In other words, differences in the I/O logs 135, 155 from the risk agents 130, 150 may be indicative of the presence of malware operating on the VM 120. If the logs are found to be considerably different, especially in high-risk areas (e.g., MBR or operating system binaries), a notification may be provided to trigger manual intervention regarding the potential risk. Note that discrepancies between the VM log 135 and kernel log 155 are not determinative of malware or something malicious; however, such discrepancies are anomalous and indicative of malware.

In certain embodiments, a user such as a system operator, may injecting an I/O to perform specific I/O accesses to probe for potential malware. Accordingly, the VM log 135 and kernel log 155 generated by the risk agents 130, 150 via the processing of the injected I/O may be compared. In other words, if a user suspects that there is malware present in a VM 120, including in a particular portion of the VM 120, the user may direct an I/O to the VM 120 (i.e., where the suspected vulnerability is), which will cause the I/O to be processed and I/O metadata to be generated in the VM log 135 and the kernel log 155. This VM log 135 and kernel log 155 data may be compared, as described above, to confirm whether there is evidence of malware.

Figure 3:
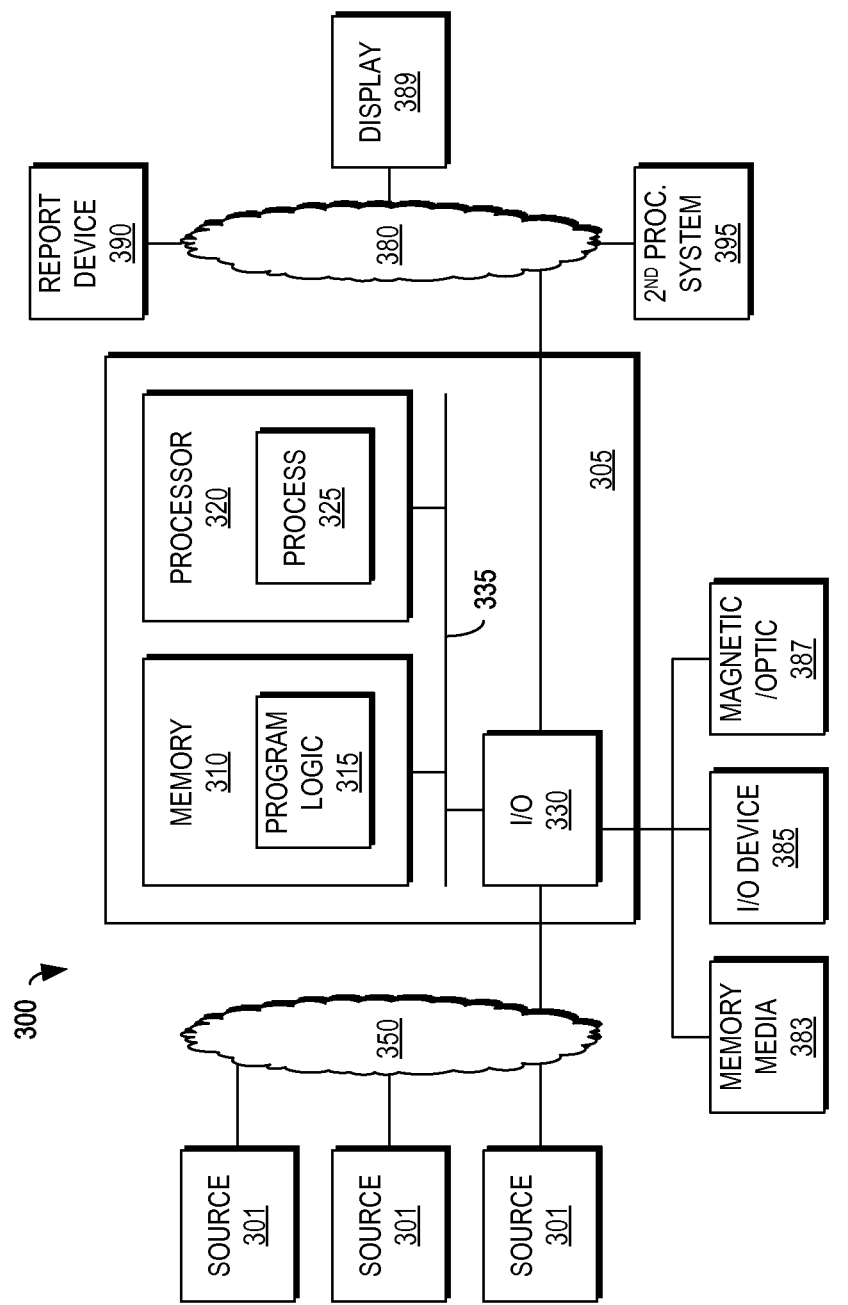
FIG. 3 is a block diagram illustrating an apparatus according to an example embodiment of the present invention.

FIG. 3 is a block diagram of an example embodiment apparatus 305 according to the present invention. The apparatus 305 may be part of a system 300 and includes memory 310 storing program logic 315, a processor 320 for executing a process 325, and a communications I/O interface 330, connected via a bus 335.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 3, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 4:
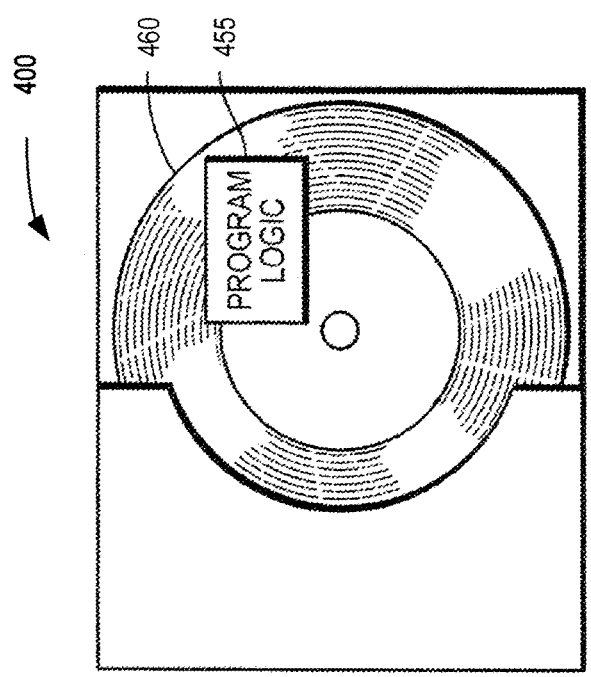
FIG. 4 is a block diagram illustrating an example embodiment of the present invention embodied in computer program code.

FIG. 4 is a block diagram of a computer program product 400 including program logic 455, encoded on a computer-readable medium 460 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:
    logging input/output (I/O) requests at a virtual machine (VM) in a VM log;
    logging I/O requests at a hypervisor kernel managing the VM in a kernel log, wherein the logging both I/O requests comprises generating signatures from both the VM log metadata and the kernel log metadata, further wherein the logging both I/O requests comprises logging one or more of a timestamp, an I/O type, a start address, an offset, and a length I/O metadata;
    comparing the I/O requests logged in the VM log and the kernel log, when comparing the I/O requests logged in the VM log and the kernel log comprises comparing the signatures; and
    detecting evidence of malware according to differences between the I/O requests logged in the VM log and the kernel log.

2. The method of claim 1 wherein comparing the I/O requests logged in the VM log and the kernel log comprises examining differences in one or more of the timestamps, the I/O types, the write start addresses, the write offsets, and the write lengths for respective I/Os as recorded in the VM log and the kernel log.

3. The method of claim 1 wherein logging I/O requests at a VM in a VM log comprises logging I/O requests to a master boot record for the VM.

4. The method of claim 1 wherein logging I/O requests at a VM in a VM log comprises logging I/O requests to an operating system for the VM.

5. The method of claim 1 wherein logging I/O requests at a hypervisor kernel managing the VM in a kernel log comprises logging VM boot-time disk access I/Os.

6. The method of claim 1 wherein logging I/O requests at a hypervisor kernel managing the VM in a kernel log is undetectable by malware operating in the VM.

7. The method of claim 1 further comprising:
    injecting an I/O to perform specific I/O accesses; and
    comparing the VM log and the kernel log to probe for potential malware.

8. The method of claim 1 further comprising providing a notification of the evidence of malware.

9. A system comprising:
    a processor;
    a memory coupled to the processor, wherein the memory has program logic comprising:
    a virtual machine computing platform having a hypervisor and managing a virtual machine (VM);
    a VM risk agent configured to log input/output (I/O) requests at the VM in a VM log; and
    a kernel risk agent configured to log the I/O requests at the hypervisor kernel in a kernel log, wherein the kernel risk agent and the VM risk agent are further configured to generate signatures from both the VM log metadata and the kernel log metadata, wherein the kernel risk agent and the VM risk agent are further configured to log one or more of a timestamp, an I/O type, a start address, an offset, and a length I/O metadata;
    a risk engine configured to compare the I/O requests logged in the VM log and the kernel log and detect evidence of malware according to differences between the I/O requests logged in the VM log and the kernel log, wherein the risk engine is further configured to compare the signatures.

10. The system of claim 9 wherein the risk engine is further configured to examine differences in one or more of the timestamps, the I/O types, the write start addresses, the write offsets, and the write lengths for respective I/Os as recorded in the VM log and the kernel log.

11. The system of claim 9 wherein the VM risk agent is further configured to log I/O requests to a master boot record for the VM.

12. The system of claim 9 wherein the VM risk agent is further configured to log I/O requests to an operating system for the VM.

13. The system of claim 9 wherein the kernel risk agent is further configured to log VM boot-time disk access I/Os.

14. The system of claim 9 wherein the kernel risk agent is undetectable by malware operating in the VM.

15. The system of claim 9
wherein the VM risk agent is further configured to inject an I/O to perform specific I/O accesses; and
wherein the risk engine is further configured to compare the VM log and the kernel log to probe for potential malware.

16. The system of claim 9 wherein the risk engine is further configured to provide a notification of the evidence of malware.

17. A computer program product including a non-transitory computer readable storage medium having computer program code encoded thereon that, when executed by a processor of a computer causes the computer to detect evidence of malware, comprising:
computer program code for logging input/output (I/O) requests at a virtual machine (VM) in a VM log;
computer program code for logging I/O requests at a hypervisor kernel managing the VM in a kernel log, wherein the logging both I/O requests comprises generating signatures from both the VM log metadata and the kernel log metadata, further wherein the logging both I/O requests comprises logging one or more of a timestamp, an I/O type, a start address, an offset, and a length I/O metadata;
computer program code for comparing I/O requests logged in a virtual machine (VM) log by a VM risk agent and a kernel log by a hypervisor kernel, wherein comparing the I/O requests logged in the VM log and the kernel log comprises comparing the signatures; and
computer program code for detecting evidence of malware according to differences between the I/O requests logged in the VM log and the kernel log.

18. The computer program product of claim 17 wherein comparing the I/O requests logged in the VM log and the kernel log comprises examining differences in one or more of the timestamps, the I/O types, the write start addresses, the write offsets, and the write lengths for respective I/Os as recorded in the VM log and the kernel log.

19. The computer program product of claim 17 further comprising:
injecting an I/O to perform specific I/O accesses; and
comparing the VM log and the kernel log to probe for potential malware.

* * * * *